(12) United States Patent
He (10) Patent No.: US 11,175,556 B2
(45) Date of Patent: Nov. 16, 2021

(54) COLOR FILM SUBSTRATE, AND DISPLAY PANEL AND PREPARATION METHOD FOR DISPLAY PANEL

(71) Applicant: HKC Corporation Limited, Shenzhen (CN)

(72) Inventor: Huai Liang He, Shenzhen (CN)

(73) Assignee: HKC Corporation Limited, Shenzhen (CN)

( * ) Notice: Subject to any disclaimer, the term of this patent is extended or adjusted under 35 U.S.C. 154(b) by 0 days.

(21) Appl. No.: 17/043,972

(22) PCT Filed: Nov. 29, 2018

(86) PCT No.: PCT/CN2018/118080
§ 371 (c)(1),
(2) Date: Sep. 30, 2020

(87) PCT Pub. No.: WO2020/073453
PCT Pub. Date: Apr. 16, 2020

(65) Prior Publication Data
US 2021/0055586 A1 Feb. 25, 2021

(30) Foreign Application Priority Data

Oct. 8, 2018 (CN) .......................... 201811167606.9

(51) Int. Cl.
*G02F 1/1368* (2006.01)
*G02F 1/1362* (2006.01)
(52) U.S. Cl.
CPC ...... *G02F 1/1368* (2013.01); *G02F 1/136286* (2013.01); *G02F 1/136222* (2021.01)
(58) Field of Classification Search
CPC .................................................. G02F 1/1368
See application file for complete search history.

(56) References Cited

U.S. PATENT DOCUMENTS 6,555,960 B1 * 4/2003 Kishi ...................... H01J 9/323
313/582
7,009,676 B1 * 3/2006 Kim ...................... G02F 1/1345
349/158
(Continued)

FOREIGN PATENT DOCUMENTS

CN 101424828 A 5/2009
CN 101676776 A 3/2010
(Continued)

OTHER PUBLICATIONS

Office Action dated Mar. 13, 2020, issued in corresponding Chinese Application No. 201811167606.9, filed Oct. 8, 2018, 7 pages.
(Continued)

*Primary Examiner* — Sang V Nguyen
(74) *Attorney, Agent, or Firm* — Christensen O'Connor Johnson Kindness PLLC (57) ABSTRACT

A color film substrate, and a display panel and a preparation method for the display panel. The color film substrate (10) comprises a first crimping region (1-1) and a color region (1-2), the color region (1-2) is provided with a common electrode 13, the common electrode 13 is connected to a lead wire of an external driving circuit board in the first crimping region by means of a first signal line. The display panel comprises an array substrate (20) provided opposite to the color film substrate (10); the array substrate comprises a display region (2-2) and a second crimping region (2-1); and the display region (2-2) is an array formed by multiple thin film transistors, and the second crimping region (2-1) is a region where a signal line on the array substrate (20) is crimped to the lead wire of the external driving circuit board.

16 Claims, 5 Drawing Sheets

(56) References Cited

U.S. PATENT DOCUMENTS

| | | | | |
|---|---|---|---|---|
| 2014/0132859 A1* | 5/2014 | Yanase | ................ | G06F 3/0445 |
| | | | | 349/12 |
| 2014/0152935 A1* | 6/2014 | Heo | ..................... | G02F 1/1339 |
| | | | | 349/43 |
| 2014/0240650 A1* | 8/2014 | Motooka | ............. | G02F 1/13452 |
| | | | | 349/110 |
| 2016/0291429 A1* | 10/2016 | Peng | .................... | G02F 1/1339 |
| 2017/0184897 A1 | 6/2017 | Rho | | |
| 2017/0212376 A1* | 7/2017 | Chen | ................. | G02F 1/134309 |

FOREIGN PATENT DOCUMENTS

| | | | |
|---|---|---|---|
| CN | 103869512 | A | 6/2014 |
| CN | 104820519 | A | 8/2015 |
| CN | 105242416 | A | 1/2016 |
| CN | 106526954 | A | 3/2017 |
| CN | 107179626 | A | 6/2017 |
| CN | 207650520 | U | 7/2018 |
| JP | 2004226654 | A | 8/2004 |

OTHER PUBLICATIONS

International Search Report dated Jun. 28, 2019, issued in corresponding International Application No. PCT/CN2018/118080, filed Nov. 29, 2018, 3 pages.

* cited by examiner

COLOR FILM SUBSTRATE, AND DISPLAY PANEL AND PREPARATION METHOD FOR DISPLAY PANEL

TECHNICAL FIELD

This application relates to the field of display technologies, and in particular, to a color film substrate, a display panel, and a preparation method for a display panel.

BACKGROUND

As the era of large-screen display approaches, display screens of televisions, mobile phones, and the like become increasingly larger, and a common electrode line of a color film substrate (that is, a substrate on a color filter (CF) side) of a liquid crystal display (LCD) is arranged on an array substrate (that is, a substrate on a thin film transistor (TFT) side). When a screen of the liquid crystal display becomes larger, there are more common electrode lines on the array substrate, and the array substrate further has signal lines such as scanning lines and data lines, making arrangement of the signal lines on the array substrate redundant and complex, and increasing the preparation difficulty and the costs of the array substrate.

SUMMARY

A color film substrate, a display panel, and a preparation method for a display panel are provided according to various embodiments of this application.

A color film substrate is provided, including a first crimping area and a color area. The color area is provided with a common electrode. The common electrode is connected to a lead of an external drive circuit board in the first crimping area through a first signal line.

In an embodiment, the first crimping area is disposed on at least one side of the color film substrate.

In an embodiment, the color area includes an array formed by a plurality of color filters of different colors.

In an embodiment, the colors of the color filters include red, green, and blue.

In an embodiment, the first crimping area includes one or more first crimping terminals, and the first crimping terminal is configured to crimp the first signal line to the lead of the external drive circuit board.

A display panel is also provided, including a color film substrate. The color film substrate includes a first crimping area and a color area. The color area is provided with a common electrode. The common electrode is connected to a lead of an external drive circuit board in the first crimping area through a first signal line. The display panel further includes an array substrate disposed opposite to the color film substrate. The array substrate includes a display area and a second crimping area. The display area is an array formed by a plurality of thin film transistors. The second crimping area is an area in which a signal line on the array substrate is crimped to the lead of the external drive circuit board.

In an embodiment, the display panel further includes a conductive unit. The conductive unit is disposed on the color film substrate, and the conductive unit is configured to connect the color film substrate and the array substrate.

In an embodiment, the display panel further includes a conductive unit. The conductive unit is disposed on the array substrate, and the conductive unit is configured to connect the color film substrate and the array substrate.

In an embodiment, the display panel further includes a conductive unit. The conductive unit is disposed on the color film substrate and the array substrate, and the conductive unit is configured to connect the color film substrate and the array substrate.

In an embodiment, the conductive unit is a conductive strip disposed on the color film substrate and located on at least one side of the color film substrate.

In an embodiment, the conductive unit is a conductive strip disposed on the array substrate and located on at least one side of the array substrate.

In an embodiment, the conductive strip is a metal strip having a width between 2 µm and 8 µm.

In an embodiment, the conductive unit is a conductive ball disposed on the array substrate and located around the array substrate.

In an embodiment, the conductive unit includes a conductive strip and a conductive ball. The conductive strip is disposed on the color film substrate and is located on two opposite sides of the color film substrate. The conductive ball is disposed on the array substrate and is located around the array substrate.

In an embodiment, the second crimping area includes a scanning line crimping area and a data line crimping area. The scanning line crimping area is disposed on a side of the array substrate along a direction of a scanning line. The data line crimping area is disposed on a side of the array substrate along a direction of the data line. The scanning line crimping area is an area in which the scanning line is crimped to a lead of an external gate drive circuit through a signal line. The data line crimping area is an area in which the data line is crimped to a lead of an external source drive circuit through a signal line.

In an embodiment, the scanning line crimping area and the data line crimping area each include one or more second crimping terminals.

A preparation method for a display panel is also provided, including:

forming a first crimping area and a color area on a color film substrate, where the color area includes an array formed by a plurality of color filters;

forming a second crimping area and a display area on an array substrate, where the display area includes an array formed by a plurality of thin film transistors; and bonding the color film substrate with the array substrate, so that the color film substrate and the array substrate are connected.

In an embodiment, before the step of bonding the color film substrate with the array substrate, so that the color film substrate and the array substrate are connected, the method further includes:

plating a conductive strip on two opposite sides of the color film substrate; and bonding a conductive ball around the array substrate.

Details of one or more embodiments of this application are provided in the following accompanying drawings and descriptions. Other features, objectives, and advantages of this application will become apparent from the specification, the accompanying drawings, and the claims.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of the present application, and persons of ordinary skill in the art may still derive other drawings from these accompanying drawings without creative efforts.

DETAILED DESCRIPTION OF THE EMBODIMENTS

Figure 1:
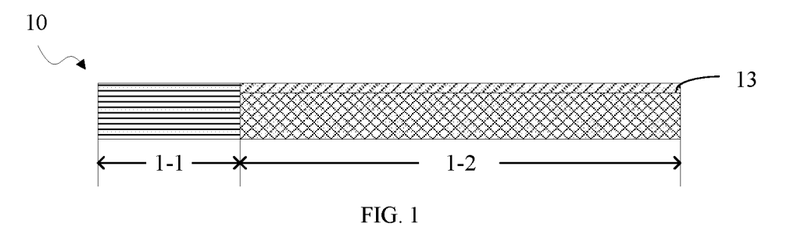
FIG. 1 is a schematic structural diagram of a color film substrate according to an embodiment.

FIG. 1 shows a color film substrate 10 according to an embodiment. The color film substrate 10 includes a first crimping area (PAD) 1-1 and a color area 1-2. The color area 1-2 is disposed with a common electrode 13, and the common electrode 13 is connected to a lead (not shown) of an external drive circuit board in the first crimping area 1-1 through a first signal line.

Specifically, the common electrode 13 is disposed above the color area 1-2 and is made of a transparent conductive material, for example, indium tin oxide (ITO).

Figure 2:
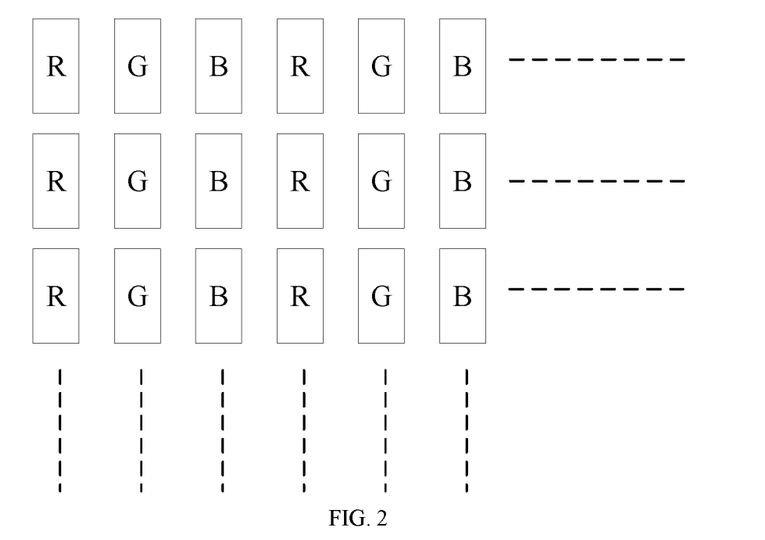
FIG. 2 is a schematic plan view of a color area according to an embodiment.

Specifically, as shown in FIG. 2, the color area 1-2 includes an array formed by a plurality of color filters of different colors. It may be understood that, the colors of the color filters include red (R), green (G), and blue (B), or include red (R), green (G), blue (B), and white (W), and the colors of the color filters are randomly arranged. Optionally, the colors of the color filters in this application include red (R), green (G), and blue (B), and the colors of the color filters are arranged in an order of RGB.

Figure 3:
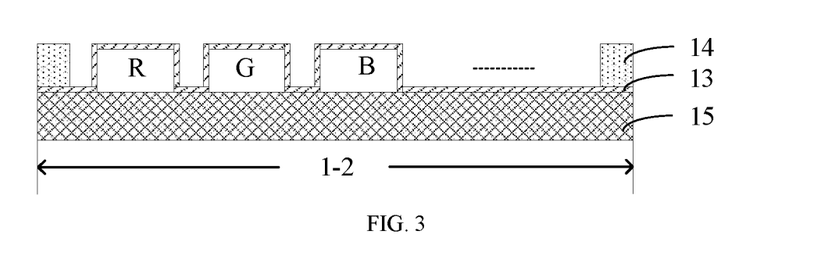
FIG. 3 is a cross sectional schematic view of a color area according to an embodiment.
Figure 4:
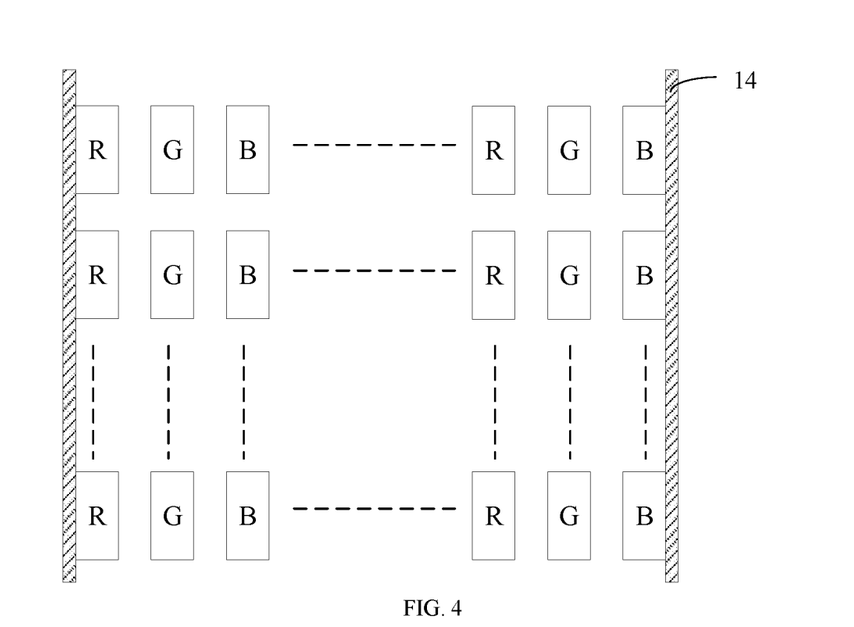
FIG. 4 is a schematic plan view of a color area according to another embodiment.

Further, as shown in FIG. 3 and FIG. 4, two opposite sides of the color area 1-2 are provided with a conductive strip 14. It may be understood that, the conductive strip 14 may further be disposed on any side of the color area 1-2 or disposed around the color area 1-2.

In this embodiment, the conductive strip 14 is located on the common electrode 13, and all of the color filters (RGB), the common electrode 13, and the conductive strip 14 are located on a glass substrate 15. Specifically, the conductive strip 14 is a metal strip. The disposing of the conductive strip on the two opposite sides of the color area 1-2 of the color film substrate 10 enables the color film substrate 10 to remain a relatively good conductive effect when the glass substrate is relatively easy to be bent.

Figure 5:
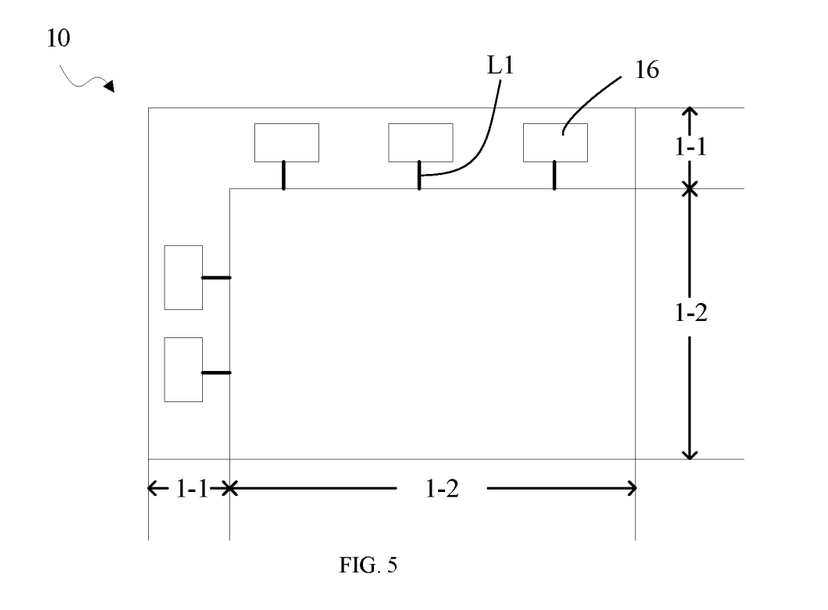
FIG. 5 is a schematic structural plan view of a color film substrate according to an embodiment.

Specifically, as shown in FIG. 5, the first crimping area 1-1 is an area in which the first signal line L 1 on the color film substrate 10 is crimped to the lead (not shown) of the external drive circuit board.

Specifically, the first crimping area 1-1 is disposed on at least one side of the color film substrate 10. It may be understood that, the first crimping area 1-1 is used to crimp the signal line on the color film substrate 10 to the lead of the external drive circuit board, and may be located on one side of the color film substrate 10, or the first crimping area may be disposed on at least two sides of the color film substrate 10 based on a need. This is not specifically limited herein.

For example, referring to FIG. 5, the first crimping area 1-1 is disposed on two neighboring sides of the color film substrate 10, and both are adjacent to the color area 1-2.

Further, as shown in FIG. 5, the first crimping area 1-1 further includes one or more first crimping terminals 16. The first crimping terminal 16 is configured to crimp the first signal line L 1 to the lead of the external drive circuit board, to implement signal interaction between the color film substrate 10 and the external drive circuit board. It may be understood that, a quantity of the first crimping terminals 16 is determined based on a quantity of the first signal lines L 1. This is not specifically limited herein.

Specifically, the first signal line L 1 is a common electrode line, that is, a trace of the common electrode 13 on the color film substrate 10.

It may be understood that, if the color film substrate 10 is not provided with a first crimping area, the trace of the common electrode 13 on the color film substrate 10 can only be arranged on the array substrate, to implement interconnection with the external drive circuit board through the crimping terminal on the array substrate. In this embodiment, the color film substrate 10 is provided with the first crimping area, so that the trace of the common electrode 13 on the color film substrate 10 can be crimped to the lead of the external drive circuit board from the first crimping area, thereby reducing a quantity of traces on the array substrate, simplifying a preparation process and reducing the preparation costs of the array substrate, and ensuring the stability and the accuracy of signal transmission.

Figure 6:
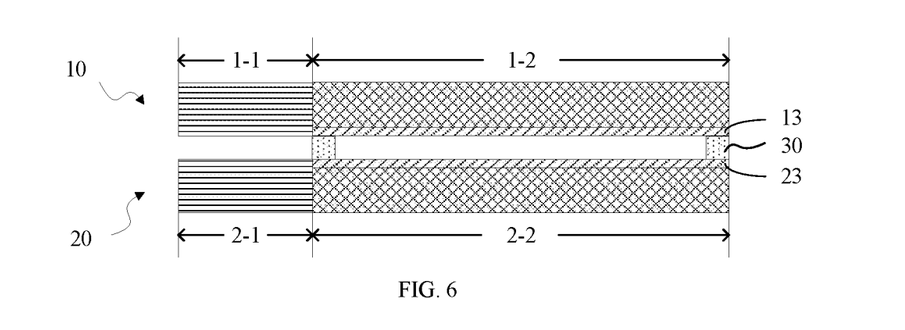
FIG. 6 is a cross sectional schematic view of a display panel according to an embodiment.

FIG. 6 shows a display panel according to an embodiment. The display panel includes the color film substrate 10, and further includes an array substrate 20 disposed opposite to the color film substrate. The array substrate 20 includes a second crimping area 2-1 and a display area 2-2. The display area 2-2 is an array formed by a plurality of thin film transistors (referring to FIG. 7). The second crimping area 2-1 is an area in which a signal line on the array substrate 20 is crimped to the lead of the external drive circuit board (not shown in FIG. 6).

Specifically, referring to FIG. 6, the display panel further includes a conductive unit 30. The conductive unit 30 is disposed on the color film substrate 10, or is disposed on the array substrate 20, or is disposed on the color film substrate 10 and the array substrate 20. The conductive unit 30 is configured to connect the color film substrate 10 and the array substrate 20. It may be understood that, liquid crystal (not shown in FIG. 6) is filled with between the color film substrate 10 and the array substrate 20, the color film substrate 10 is provided with the common electrode 13, and the array substrate 20 is provided with a pixel electrode 23. The conductive unit 30 is configured to connect the common electrode 13 and the pixel electrode 23, to form a drive electric field between the color film substrate 10 and the array substrate 20 to control liquid crystal molecules.

Further, as shown in FIG. 3, the conductive unit 30 is a conductive strip 14, and the conductive strip 14 is disposed on the color film substrate 10 and is located on at least one side of the color film substrate 10. It may be understood that, the conductive strip 14 may further be disposed on the array substrate 20, and is located on at least one side of the array substrate 20. Optionally, the conductive strip 14 is a metal strip and has a width between 2 μm and 8 μm. A length is determined based on a length of the color film substrate 10 or a length of the array substrate 20. This is not specifically limited herein.

In this embodiment, the conductive unit 30 is disposed on only the color film substrate 10, or is disposed on only the array substrate 20. When the color film substrate 10 is bonded with the array substrate 20, the conductive strip 14 connects the common electrode 13 of the color film substrate 10 and the pixel electrode 23 of the array substrate 20, to form a drive electric field between the color film substrate 10 and the array substrate 20 to control liquid crystal molecules.

Figure 7:
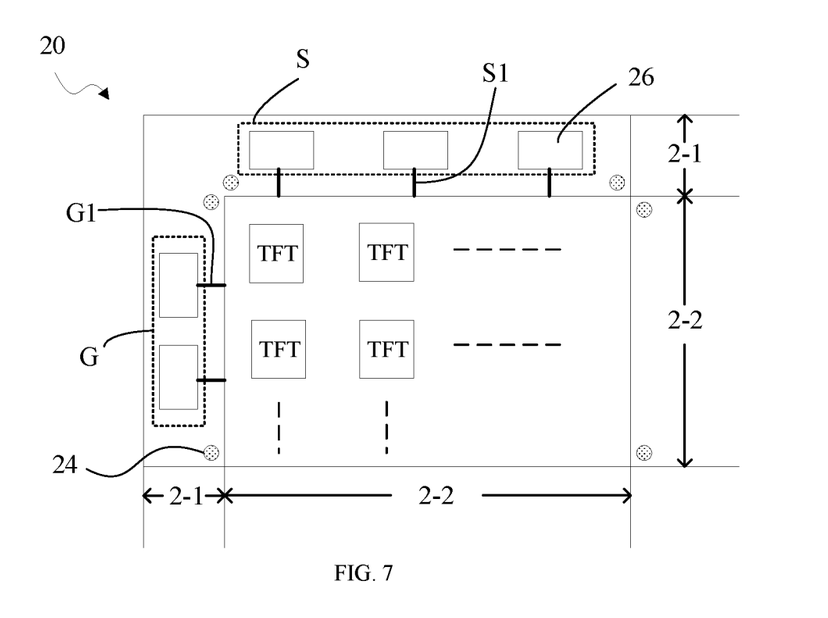
FIG. 7 is a schematic structural plan view of an array substrate according to an embodiment.

Further, as shown in FIG. 7, the conductive unit 30 is a conductive ball 24, and the conductive ball 24 is disposed on the array substrate 20 and is located around the array substrate 20. It may be understood that, the conductive ball 24 is adjacent to the display area 2-2. A TFT array is formed in the display area 2-2, and the TFT array is arranged corresponding to the color filter in the color area 1-2 on the color film substrate 10 (referring to FIG. 2). Optionally, the conductive ball 24 is a metal ball.

In this embodiment, the conductive unit 30 is disposed on only the array substrate 20. When the color film substrate 10 is bonded with the array substrate 20, the conductive ball 24 connects the common electrode 13 of the color film substrate 10 and the pixel electrode 23 of the array substrate 20, to form a drive electric field between the color film substrate 10 and the array substrate 20 to control liquid crystal molecules. It may be understood that, a quantity of the conductive balls 24 is set based on an actual conductive effect. If the conductive effect is poor, the quantity of the conductive balls 24 may be properly increased.

Further, the conductive unit 30 includes a conductive strip 14 and a conductive ball 24. The conductive strip 14 is disposed on the color film substrate 10 and is located on at least one side of the color film substrate 10. The conductive ball 24 is disposed on the array substrate 20 and is located around the array substrate 20.

In this embodiment, the conductive unit 30 is disposed on the color film substrate 10 and the array substrate 20, and the conductive strip 14 located on the color film substrate 10 is disposed opposite to the conductive ball 24 located on the array substrate 20. When the color film substrate 10 is bonded with the array substrate 20, the conductive strip 14 and the conductive ball 24 work jointly, to connect the common electrode 13 of the color film substrate 10 and the pixel electrode 23 of the array substrate 20, thereby forming a drive electric field between the color film substrate 10 and the array substrate 20 to control liquid crystal molecules. It may be understood that, the disposing of the conductive strip 14 on the color film substrate 10 can reduce the quantity of the conductive balls 24 on the array substrate 20, reduce the preparation time and the preparation costs of the array substrate 20, and improve the conductive performance of the color film substrate 10 and the array substrate 20.

Specifically, referring to FIG. 7, the second crimping area 2-1 includes a scanning line crimping area G and a data line crimping area S. The scanning line crimping area G is disposed on a side of the array substrate 20 along a direction of a scanning line, and the data line crimping area S is disposed on a side of the array substrate 20 along a direction of the data line. The scanning line crimping area G is an area in which the scanning line is crimped to a lead of an external gate drive circuit through a signal line G1. The data line crimping area S is an area in which the data line is crimped to a lead of an external source drive circuit through a signal line S1.

It may be understood that, the scanning line crimping area G and the data line crimping area S each include one or more second crimping terminals 26. A quantity of the second crimping terminals 26 is determined based on the signal line G1 and the signal line S1 in the actual display area 2-2. This is not specifically limited herein.

In an embodiment, a part of the first signal line L 1 of the common electrode 13 of the color film substrate 10 is crimped to the lead of the external drive circuit board from the scanning line crimping area G or from the data line crimping area S.

Figure 8:
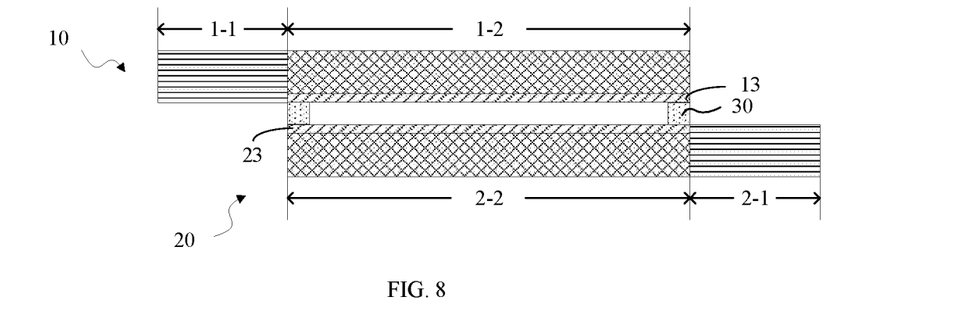
FIG. 8 is a cross sectional schematic view of a display panel according to another embodiment.

Specifically, the color area 1-2 of the color film substrate 10 is bonded with the display area 2-2 of the array substrate 20, and the color filters and the TFTs are arranged in a one-to-one correspondence. It may be understood that, the first crimping area 1-1 may be located on any side of the color film substrate 10, and the second crimping area 2-1 may be located on any side of the array substrate 20, and therefore the first crimping area 1-1 and the second crimping area 2-1 may be disposed in alignment with each other (referring to FIG. 6) or are respectively disposed on two separate sides (referring to FIG. 8).

Figure 9:
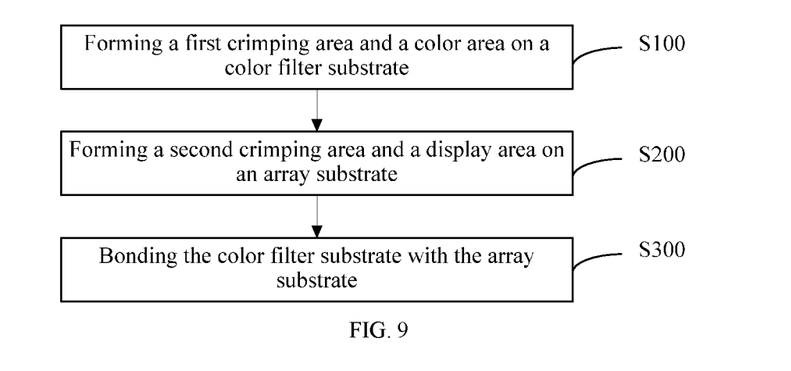
FIG. 9 is a flowchart of a display panel preparation method according to an embodiment.

FIG. 9 shows a display panel preparation method according to an embodiment. The method includes the following the steps.

Step S100: a first crimping area 1-1 and a color area 1-2 is formed on a color film substrate 10. The color area 1-2 includes an array formed by a plurality of color filters.

Step S200: a second crimping area 2-1 and a display area 2-2 are formed on the array substrate. The display area 2-2 includes an array formed by a plurality of thin film transistors.

Step S300: the color film substrate 10 is bonded with the array substrate 20, so that the color film substrate 10 and the array substrate 20 are connected.

Figure 10:
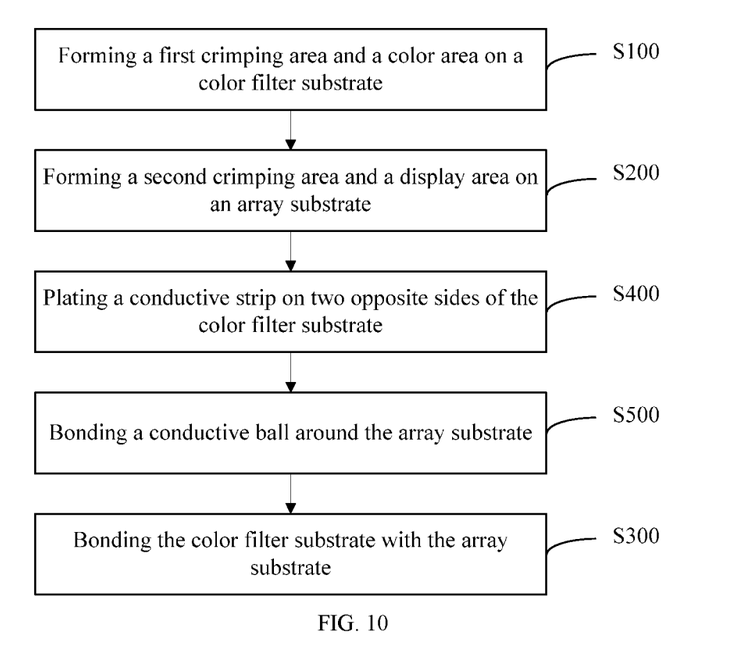
FIG. 10 is a flowchart of a display panel preparation method according to another embodiment.

Specifically, as shown in FIG. 10, before step S300, the method further includes the following the steps.

Step S400: two opposite sides of the color film substrate are plated with a conductive strip.

Step S500: a conductive ball is bonded around the array substrate.

In this embodiment, first, the color film substrate 10 is cleaned, and is coated in sequence with photoresists of different colors (that is, the RGB color filters), so that the array formed by the plurality of color filters is formed on the color film substrate 10; and then, the metal strip (the conductive strip) is plated on the two opposite sides of the color film substrate 10; and finally a plurality of crimping terminals (the first crimping area 1-1) are disposed on at least one side of the color film substrate 10, configured to crimp the first signal line L 1 of the common electrode 13 to the lead of the external drive circuit board, to implement signal interaction between the color film substrate 10 and the external drive circuit board.

In addition, the array substrate 20 is cleaned, and the metal ball (the conductive ball) and the second crimping area are formed on the array substrate 20 based on the preparation process of the array substrate 20; and then a sealant and the liquid crystal are coated; and finally the array substrate 20 is bonded with the color film substrate 10.

It should be noted that, the display area 2-2 of the array substrate 20 has the signal lines G1 and S1 such as the scanning line and the data line, and components such as the pixel electrode 23 and the thin film transistor (TFT). The color film substrate 10 has the common electrode 13 and the first signal line L 1 of the common electrode 13. The electric field that drives the liquid crystal is formed through the components. The crimping area (including the first crimping area 1-1 and the second crimping area 2-1) is a crimping area, and is the area in which the first signal line L 1 of the color film substrate 10 and the signal line of the array substrate 20 are separately crimped to the lead of the external drive circuit board (for example, Chip On Film (COF) after a segmentation and grinding process. The crimping area is generally provided with only a signal line, and does not need components such as the pixel electrode and the TFT. The crimping area is located on one of the four sides of the color film substrate 10 and one of the four sides of the array substrate 20, or is located on two neighboring sides of the four sides of the color film substrate 10 and two neighboring sides of the four sides of the array substrate 20. To electrically connect the lead of the external drive circuit board and the first signal line L 1 of the color film substrate 10 or the signal line of the array substrate 20, the signal line of the crimping area needs to be not covered by an insulation layer (such as a gate insulation layer or a passivation layer).

It should be further noted that, the design solution in this application is mainly improvement made for a twisted nematic (TN)-type liquid crystal panel. The TN-type liquid crystal panel is different from an In-Plane Switching (IPS)-type liquid crystal panel or a fringe field switching (FFS)-type liquid crystal panel in that for the TN-type liquid crystal panel, both an upper substrate and a lower substrate are provided with an electrode; in other words, the upper substrate (the color film substrate 10) is provided with the common electrode 13, and the lower substrate (the array substrate 20) is provided with the pixel electrode 23, and the two electrodes plus the voltage form a vertical electric field, so that a polarization direction of the liquid crystal rotates to be parallel with a direction of the electric field. However, for both the IPS-type liquid crystal panel and the FFS-type liquid crystal panel, the voltage is added to an electrode of a single substrate, to form a horizontal electric field, and therefore the liquid crystal molecules are also twisted in parallel with the substrate. Therefore, for the TN-type liquid crystal panel in this application, the array substrate 20 and the color film substrate 10 are connected through the conductive unit 30, and the common electrode 13 on the color film substrate 10 is crimped to the lead of the external drive circuit board through the first signal line L 1 in the first crimping area 1-1, to supply power to the color film substrate 10, thereby forming an electric field that is vertical to the liquid crystal panel.

The first crimping area 1-1 is disposed on color film substrate 10, so that the first signal line L 1 of the common electrode 13 on the color film substrate 10 may be connected to the lead of the external drive circuit board in the first crimping area 1-1, thereby avoiding a problem that the signal lines arranged on the array substrate 20 are redundant and complex.

Technical features in the foregoing embodiments may be combined randomly. For the brevity of description, not all possible combinations of various technical features in the foregoing embodiments are described. However, as long as combinations of these technical features do not contradict each other, it should be considered that the combinations all fall within the scope of this specification.

The foregoing embodiments only describe several implementations of this application, which are described specifically and in detail, and therefore cannot be construed as a limitation to the patent scope of the present invention. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A color film substrate, comprising a first crimping area and a color area, both the first crimping area and the color area being part of the color film substrate, wherein the color area is provided with a common electrode connected to a lead of an external drive circuit board in the first crimping area through a first signal line,
   wherein the first crimping area is configured to crimp the first signal line to the lead of the external drive circuit board and is disposed on two neighboring sides of the color film substrate, and
   wherein the first crimping area comprises one or more first crimping terminals, and the first crimping terminal is configured to crimp the first signal line to the lead of the external drive circuit board.

2. The color film substrate according to claim 1, wherein the color area comprises an array formed by a plurality of color filters of different colors.

3. The color film substrate according to claim 2, wherein the colors of the color filters comprise red, green, and blue.

4. A display panel, comprising a color film substrate, wherein the color film substrate comprises a first crimping area and a color area, both the first crimping area and the color area are part of the color film substrate, the color area is provided with a common electrode connected to a lead of an external drive circuit board in the first crimping area through a first signal line, the first crimping area is configured to crimp the first signal line to the lead of the external drive circuit board and is disposed on two neighboring sides of the color film substrate, the first crimping area comprises one or more first crimping terminals, and the first crimping terminal is configured to crimp the first signal line to the lead of the external drive circuit board, and wherein the display panel further comprises an array substrate disposed opposite to the color film substrate, the array substrate comprises a display area and a second crimping area, the display area is an array formed by a plurality of thin film transistors, and the second crimping area is an area in which a signal line on the array substrate is crimped to the lead of the external drive circuit board.

5. The display panel according to claim 4, further comprising a conductive unit, wherein the conductive unit is disposed on the color film substrate, and the conductive unit is configured to connect the color film substrate and the array substrate.

6. The display panel according to claim 4, further comprising a conductive unit, wherein the conductive unit is disposed on the array substrate, and the conductive unit is configured to connect the color film substrate and the array substrate.

7. The display panel according to claim 4, further comprising a conductive unit, wherein the conductive unit is disposed on both of the color film substrate and the array substrate, and the conductive unit is configured to connect the color film substrate and the array substrate.

8. The display panel according to claim 5, wherein the conductive unit is a conductive strip disposed on the color film substrate and located on at least one side of the color film substrate.

9. The display panel according to claim 5, wherein the conductive unit is a conductive strip disposed on the array substrate and located on at least one side of the array substrate.

10. The display panel according to claim 8, wherein the conductive strip is a metal strip having a width between 2 μm and 8 μm.

11. The display panel according to claim 5, wherein the conductive unit is a conductive ball disposed on the array substrate and located around the array substrate.

12. The display panel according to claim 5, wherein the conductive unit comprises a conductive strip and a conductive ball, the conductive strip is disposed on the color film substrate and is located on two opposite sides of the color film substrate, and the conductive ball is disposed on the array substrate and is located around the array substrate.

13. The display panel according to claim 4, wherein: the second crimping area comprises a scanning line crimping area and a data line crimping area; the scanning line crimping area is disposed on a side of the array substrate along a direction of a scanning line, and the data line crimping area is disposed on a side of the array substrate along a direction of the data line; the scanning line crimping area is an area in which the scanning line is crimped to a lead of an external gate drive circuit through a signal line; and the data line crimping area is an area in which the data line is crimped to a lead of an external source drive circuit through a signal line.

14. The display panel according to claim 13, wherein the scanning line crimping area and the data line crimping area each comprise one or more second crimping terminals.

15. A preparation method for a display panel, comprising:
forming a first crimping area and a color area on a color film substrate, wherein both the first crimping area and the color area are part of the color film substrate the color area comprises an array formed by a plurality of color filters, and the first crimping area is configured to crimp a first signal line on the color film substrate to a lead of an external drive circuit board and is disposed on two neighboring sides of the color film substrate;
providing a plurality of crimping terminals in the first crimping area, wherein the first crimping terminal is configured to crimp the first signal line to the lead of the external drive circuit board;
forming a second crimping area and a display area on an array substrate, wherein the display area comprises an array formed by a plurality of thin film transistors; and
bonding the color film substrate with the array substrate, so that the color film substrate and the array substrate are connected.

16. The preparation method according to claim 15, wherein before bonding the color film substrate with the array substrate, so that the color film substrate and the array substrate are connected, the method further comprises:
plating a conductive strip on two opposite sides of the color film substrate; and
bonding a conductive ball around the array substrate.

* * * * *